United States Patent [19]

Pruitt

[11] Patent Number: 4,688,165
[45] Date of Patent: Aug. 18, 1987

[54] CURRENT FED INVERTER BRIDGE WITH CONDUCTION OVERLAP AND LOAD TUNING

[75] Inventor: Duard L. Pruitt, Cinnaminson, N.J.
[73] Assignee: RCA Corporation, Princeton, N.J.
[21] Appl. No.: 850,813
[22] Filed: Apr. 11, 1986
[51] Int. Cl.⁴ .................................... H02M 7/5387
[52] U.S. Cl. ................................... 363/132; 363/17
[58] Field of Search ............... 363/17, 27, 73, 132, 363/136

[56] References Cited

U.S. PATENT DOCUMENTS

| | | | |
|---|---|---|---|
| 3,059,191 | 10/1962 | Heirholzer, Jr. et al. | 331/113 |
| 3,065,429 | 11/1962 | Merkal | 363/73 |
| 4,186,330 | 1/1980 | Bohringer | 315/411 |
| 4,227,243 | 10/1980 | Gurwicz et al. | 363/132 |
| 4,264,949 | 4/1981 | Simmons et al. | 363/17 |
| 4,460,949 | 8/1984 | Steigerwald | 363/136 |
| 4,475,149 | 10/1984 | Gallios | 363/132 |
| 4,477,868 | 10/1984 | Steigerwald | 363/17 |
| 4,523,269 | 6/1985 | Baker et al. | 363/138 |
| 4,555,754 | 11/1985 | Hennevin | 363/132 |
| 4,581,565 | 4/1986 | Van Pelt et al. | 318/294 |

FOREIGN PATENT DOCUMENTS 0961079 9/1982 U.S.S.R. ............................ 363/132

OTHER PUBLICATIONS

"High Impedance Electronics" published at pp. 32, 33 of Wireless World Magazine, Apr. 1983, Purves.

Primary Examiner—Patrick R. Salce
Assistant Examiner—Jeffrey Sterrett
Attorney, Agent, or Firm—Berard, Jr. Clement A.; William H. Meise

[57] ABSTRACT

Switching stress on the switches of a DC-to-AC inverter bridge are reduced, and fall time losses are reduced, by driving the inverter from a source of constant current, by operating the bridge in a mode in which all the switches are periodically rendered conductive simultaneously, and by tuning the load to produce resonant currents which reduce the currents through the switches of the inverter at the moment of turn-off.

10 Claims, 15 Drawing Figures

CURRENT FED INVERTER BRIDGE WITH CONDUCTION OVERLAP AND LOAD TUNING

This invention relates to inverter bridges suitable for high power, high frequency use, in which fall time losses are reduced by driving the bridge from a source of substantially constant current, by overlapping the conduction intervals of the switches of the bridge, and by tuning of the load.

BACKGROUND OF THE INVENTION

Modern high power transmitters such as those used for television or radar transmission require vacuum tubes which operate at relatively high voltages and which draw substantial amounts of current. It is relatively easy to supply direct high voltage at high current by applying alternating current from the power mains to the primary winding of a transformer, the secondary winding of which produces a high alternating voltage. High voltage rectifiers are connected to the secondary winding of the transformer to rectify the alternating current to produce direct current. Filter capacitors may be used to reduce voltage ripple. Such an arrangement tends to be bulky and expensive, because of the large physical size of the transformer required for operation at power line frequencies, and because of the very large values of filter capacitance and associated working voltage of the filter capacitors.

It is known that operation of a transformer at a high frequency can effect a significant reduction in size. Furthermore, operation at high frequencies reduces the capacitance of the requisite filter capacitors in proportion of the ratio of frequencies. It is often desirable to operate an inverter at a frequency which is equal to or a multiple of the operating frequency of the system being powered. For example, in television practice, it is common to operate the high voltage kinescope power supply at 15,750 Hz, which is the horizontal deflection frequency.

In order to generate the high frequency drive for the primary of a voltage step-up transformer, it is common to produce a relatively low direct voltage by rectifying and filtering the power mains, and to apply the relatively low direct voltage so produced to a bridge inverter to generate an alternating potential at a high frequency which may be applied to the primary winding of the step-up transformer.

In order to maximize the efficiency of conversion of power from the alternating current power mains into radio frequency power, it is important to minimize the losses in the high frequency inverter. These losses are for the most part associated with the solid state switching elements of the inverter, and include rise time loss, conduction loss and fall time loss. In most practical applications, rise time loss is relatively small, since circuit inductances limit the rise time of the currents. The presence of these inductances causes the voltage across the switching element to decrease to near zero before significant current flows through the switching device. Conduction loss through the solid state switching elements is minimized by proper selection of the switching device itself, by paralleling of the switching devices if necessary, and by application of proper switch drive. In the case of bipolar transistor switches, the switch drive is base current, and in the case of FET switches, the switch drive is gate voltage.

In a bipolar transistor inverter driven from a source of substantially constant voltage, the collector voltage of each switch transistor ordinarily rises to substantially its maximum value before the collector current begins to decrease at each turn-off interval. During the period when collector voltage is applied and collector current continues to flow, fall time losses occur. Fall time losses increase linearly as operating frequency is increased, and tend to be the most important of the losses in the inverter. In a bridge type inverter to which a substantially constant voltage is applied, fall time loss is described by the equation $$P_{FALL} = \frac{i_{peak} \, v_{peak}}{2}(t_c)(f)$$

where $i_{peak}$ is the peak switch current, $v_{peak}$ is the peak switch voltage, $t_c$ is the crossover time, and $f$ is the operating frequency. Crossover time $t_c$ is the time interval between the beginning of the voltage rise across a switch (commonly measured at the 10% point) until the end of the current fall (10% of the maximum value).

It is desirable to reduce the stresses imposed on the switches of a bridge inverter and to reduce the losses occasioned during inverter operation.

SUMMARY OF THE INVENTION

A direct-current to alternating-current inverter includes a first series combination of first and second controllable switches having a first intermediate terminal therebetween. The first series combination is adapted to be coupled to the terminals of a source of substantially constant direct current. A second series combination of third and fourth controllable switches including a second intermediate terminal therebetween is coupled in parallel with the first series combination. A load is coupled to the first and second intermediate terminals. A capacitance is coupled across the load to form a parallel combination. An inductance is serially coupled with the parallel combination of the load and capacitance. The switches are controlled in a recurrent sequence of four intervals. During the first interval of the sequence, the first and fourth controllable switches are maintained conductive and the second and third controllable switches are maintained nonconductive for directing the substantially constant direct current through the inductance and the load in a first polarity. The second interval begins when the second and third controllable switches are rendered conductive, whereby all the switches are conductive, which reduces the voltage between the first and second intermediate terminals to zero, and creates paths by which the inductance can ring with the capacitance to form a first ringing current which reduces the current in the first and fourth controllable switches. The third interval of the recurrent sequence begins when the first and fourth controllable switches are rendered nonconductive at a time when the current therethrough is less than one-half of the substantially constant direct current. During the remainder of the third interval, only the second and third controllable switches are conductive, whereby a voltage appears across the first and second intermediate terminals poled to cause the substantially constant direct current to flow through the inductance and the load in a second polarity. The first and fourth controllable switches are rendered conductive during a fourth interval of the recurrent sequence whereby all the switches are conductive, again reducing the voltage between the first and second intermediate terminal to zero, and creating paths by which the inductance and capacitance can ring to reduce the current flow in the second and third switches. The second and third controllable switches are rendered nonconductive at a time when the current therethrough is less than one-half of the substantially constant direct current to once again begin a first interval of the recurrent sequence.

DETAILED DESCRIPTION OF THE INVENTION

Figure 1A:
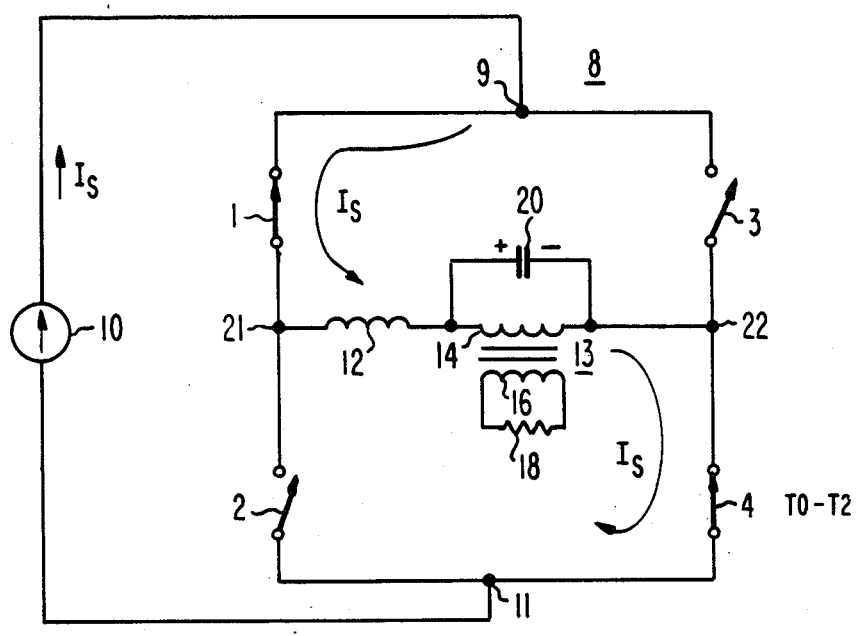
FIGS. 1a–1g are simplified schematic diagrams of an inverter bridge according to the invention in various operating states, illustrating the current flows.

FIG. 1a is simplified schematic diagram of a current fed inverter. In FIG. 1a, a source 10 produces a substantially constant direct current illustrated as $I_s$. Current $I_s$ is applied to a terminal 9 of an inverter bridge designated generally as 8, and returns to source 10 by way of a terminal 11. Inverter bridge 8 includes the series combination of switches 1 and 2 connected between the terminals of source 10. Between switches 1 and 2 is a node 21. The series combination of further switches 3 and 4 is connected in parallel with the series combination of switches 1 and 2 at terminals 9 and 11. Switches 3 and 4 have a node 22 at their juncture. Connected between nodes 21 and 22 is the series combination of an inductor 12 and the parallel combination of a capacitor 20 and the primary winding 14 of a transformer 13. Transformer 13 has a secondary winding 16 which drives a load represented by a resistor 18. In effect, primary winding 14 is the load which is driven by inverter circuit 8, and secondary winding 16 and its associated resistor 18 may be ignored for purposes of understanding the invention.

Figure 2:
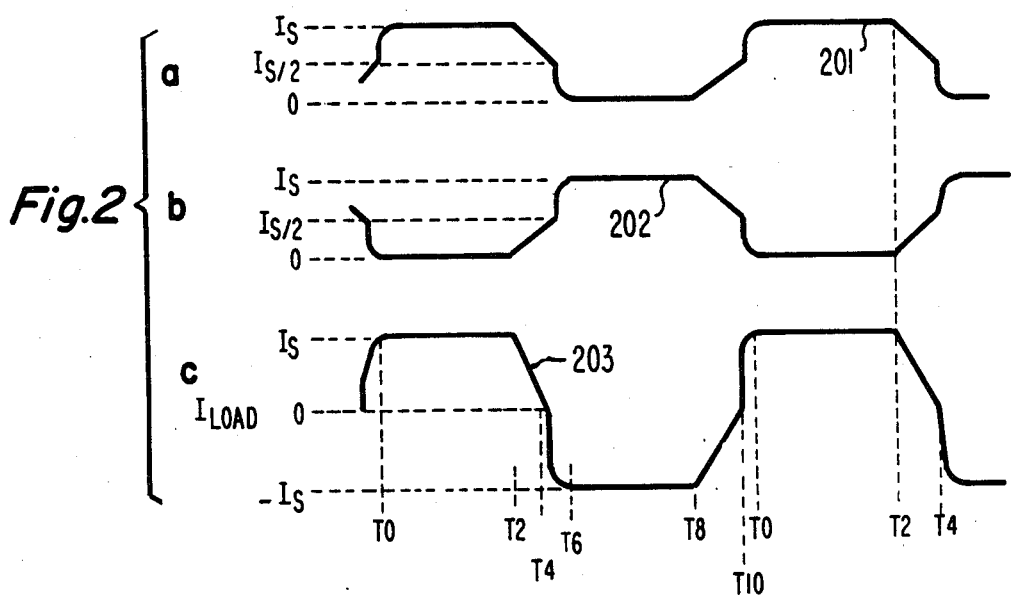
FIGS. 2a–2c are plots of current versus time in the inverter circuit represented by FIGS. 1a–1g.

As illustrated in FIG. 1a, switches 1 and 4 are closed or conductive, while switches 2 and 3 are open or nonconductive. As indicated by the legend T0–T2 of FIG. 2a, the illustrated switch configuration is that occurring in an interval T0–T2, which is part of a recurrent cycle of four intervals, as described in more detail below. With switches 1 and 4 closed, current $I_s$ flows from source 10 and terminal 9 through switch 1 to node 21, and from node 21 through inductor 12 and primary winding 14 to node 22. Current $I_s$ flows from node 22 through closed switch 4 back to current source 10 by way of terminal 11. The flow of current $I_s$ from left to right through primary winding 14 causes a voltage drop across winding 14 which causes capacitor 20 to assume a charge having a polarity illustrated by a plus (+) and minus (−) symbols. So long as the switch configuration is not altered, inverter 8 will remain in the illustrated condition indefinitely.

FIG. 2a illustrates as waveform 201 the current flow in either of switches 1 or 4 as a function of time. As illustrated in FIG. 2a, current 201 has a magnitude of $I_s$ in the interval T0–T2, corresponding to current flow having magnitude $I_s$ in either of switches 1 or 4. FIG. 2b illustrates as waveform 202 the current flow in either of switches 2 or 3. In the interval T0–T2, current 202 has zero magnitude, corresponding to no current flow. This is expected, since switches 2 and 3 are open during interval T0–T2. FIG. 2c illustrates the current flow through the load (through primary winding 14) as a function of time. As illustrated in interval T0–T2, the magnitude of the current is $+I_s$. The positive (+) direction of current flow is conventional current flow from left to right, as in FIG. 1a.

Figure 1B:
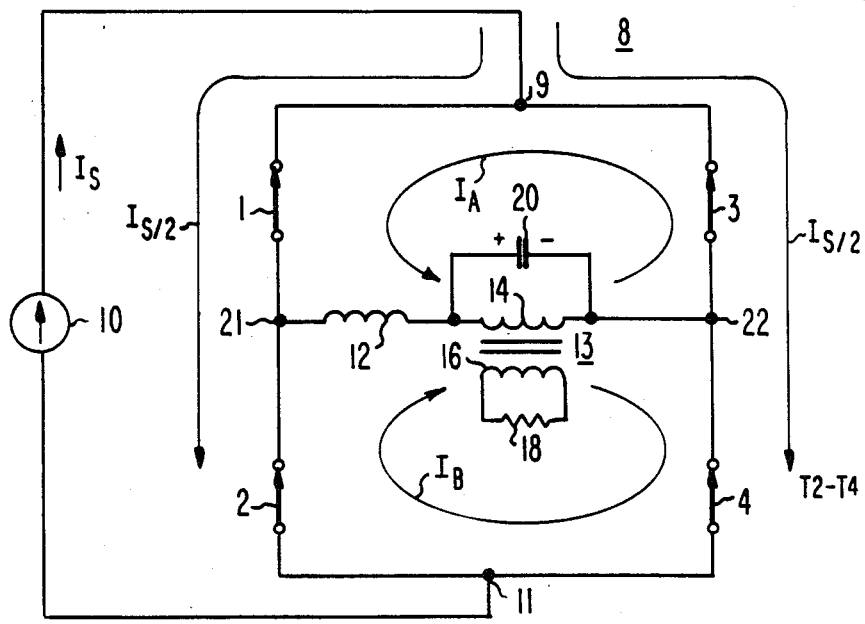

FIG. 1b illustrates inverter bridge 8 in a second operating mode which prevails during a second operating interval extending from time T2 to a later time T6. FIG. 1b, however, pertains only to the interval T2–T4 in order to better explain the flow of currents in bridge 8. During interval T2–T4, all 4 switches (1, 2, 3 and 4) are conductive. Consequently, current source 10 is short-circuited, and current having a magnitude $I_s$ flowing from source 10 may be viewed as dividing at terminal 9 into two equal portions, each having a magnitude of $I_s/2$, one of which flows from terminal 9 through switch 1, past node 21, and through switch 2 to terminal 11, and the other of which flows from terminal 9 through switch 3, past node 22, and through switch 4 to terminal 11. At terminal 11, the two currents combine to form a current of magnitude $I_s$ which returns to source 10. Closing of all four switches also short-circuits between nodes 21 and 22 by a first current path ($I_A$) extending from node 22 through switch 3, terminal 9 and switch 1 and by a second path ($I_B$) extending from node 22 through switch 2, terminal 11 and switch 4. It should be noted that the magnitude of the current flow from source 10 does not change when it is short-circuited, because of its relatively high internal impedance, which maintains substantially constant current flow at all load impedances.

Just before time T2, current was flowing from left to right through inductor 12 with magnitude $I_s$. As known, current flow through an inductor creates a magnetic field which tends to maintain the current when the drive is removed. When nodes 21 and 22 are short-circuited at time T2 by closure of all the switches, current continues to flow through inductor 12 and through the parallel combination of winding 14 and capacitor 20. The current produced by inductor 12 divides when it reaches node 22, and half of it flows by way of current path $I_A$ back to inductor 12, and the other half flows by current path $I_B$ back to inductor 12. The state of inverter bridge 8 in interval T2–T4 is illustrated in FIG. 1b. At instant T2, the magnitude of the current through inductor 12 is $I_s$, and therefore the currents flowing in paths $I_A$ and $I_B$ each have a magnitude of $I_s/2$. At moment T2, current flowing in path $I_A$ and having magnitude $I_s/2$ opposes that portion of the current flowing in switch 3 attributable to short-circuiting of source 10, which also has magnitude $I_s/2$. Consequently, at time T2, the current flow through switch 3 has a net magnitude of zero. The current through switch 1 at time T2 is the sum of the current attributable to short-circuiting of source 10 and having magnitude of $I_s/2$ and the current flowing in path $I_A$, also having magnitude $I_s/2$. Consequently, at time T2 the current flowing in switch 1 has a sum magnitude of $I_s$. Similarly, at time T2, current flowing in path $I_B$ and having magnitude $I_s/2$ adds in switch 4 to the current flowing in switch 4 due to the short-circuiting of source 10 to produce a sum current having a magnitude of $I_s$, and subtracts from the current flowing in switch 2 attributable to short circuiting of source 10, for a net current of zero. Remarkably, the current flow in switches 1, 2, 3 and 4 is exactly the same immediately before and immediately after time T2, notwithstanding that at time T2 all the switches are rendered conductive.

Figure 1C:
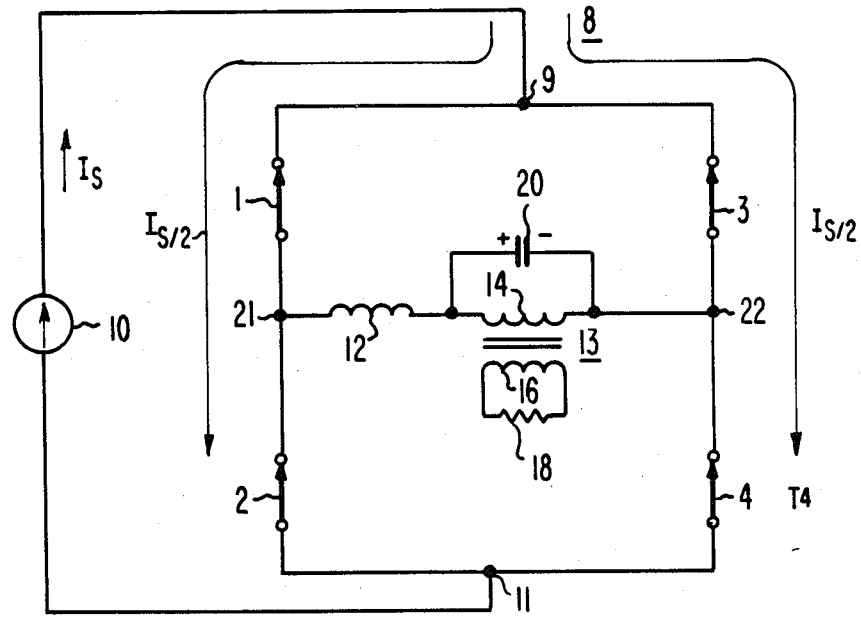

During the interval T2–T4 (FIG. 1b), the energy stored in inductor 12 decreases as energy is transferred to winding 14. As a result, the current flow through inductor 12 and in current paths $I_A$ and $I_B$ decreases. The voltage across capacitor 12 in the interval T2–T4 depends upon the type of load on secondary winding 16 of transformer 13. If the load is resistive, as suggested by resistor 18, the voltage across capacitor 20 decreases in proportion to the current through inductor 12. If, as is often the case, resistor 18 represents a full wave rectifier feeding a capacitor filter, the voltage across capacitor 20 remains constant at its maximum value until inductor 12 completes its discharge to zero current at time T4. At time T4, the energy stored in the form of magnetic fields about inductor 12 is exhausted. FIG. 1c illustrates the state of inverter bridge 8 at time T4. As illustrated in FIG. 1c, current having magnitude $I_s/2$ continues to flow through switches 1, 2, 3 and 4 due to the short-circuiting of source 10. Currents $I_A$ and $I_B$ are not shown, because they have zero magnitude. Currents 201 and 202 as illustrated in FIG. 2a and 2b have magnitude $I_s/2$ at time T4, and load current 203 has zero magnitude, as illustrated in FIG. 2c. For a rectifier-capacitor load as discussed above, at time T4, current begins to flow in a reverse or negative (−) direction (to the left) through inductor 12 under the impetus of the voltage across charged capacitor 20, which is poled as illustrated in FIG. 1c. The reversal of current polarity is indicated by the direction of excursion of waveform 203 of FIG. 2c in the interval T4–T6.

Figure 1D:
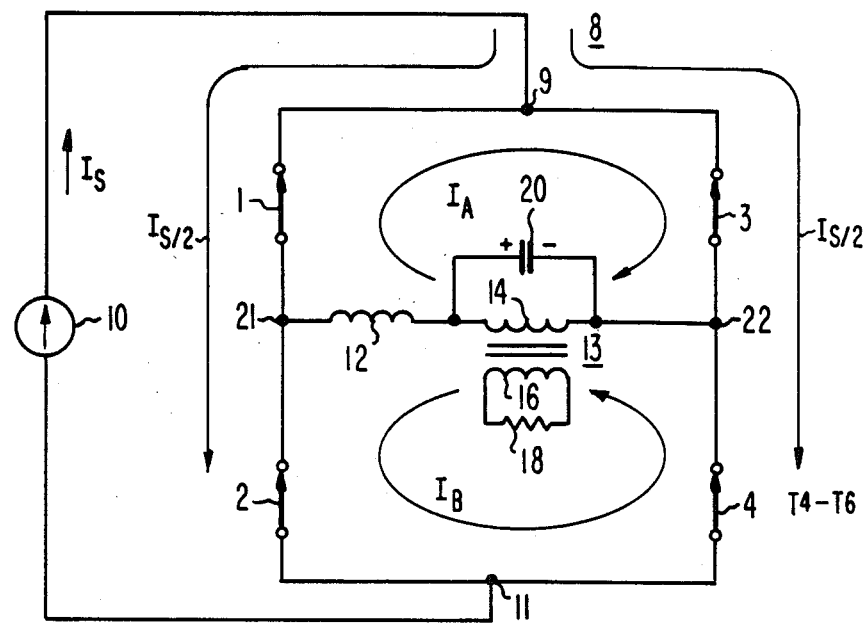

FIG. 1d illustrates the current flow during the interval T4–T6. During interval T4–T6, switches 1, 2, 3 and 4 continue to be closed, establishing a short-circuit across source 10 and also short-circuiting nodes 21 and 22 together by current paths $I_A$ and $I_B$. An increasing negative current flows through capacitor 20 and inductor 12, dividing at node 21 to flow by paths $I_A$ and $I_B$ and back to capacitor 20 by way of node 22. The increasing current flowing in path $I_A$ subtracts from the current flow through switch 1 attributable to short-circuiting of source 10, causing the current therethrough to decrease as illustrated in the interval T4–T6 by waveform 201 of FIG. 2a. The increasing current flowing in path $I_A$ adds to the current flowing through switch 3 attributable to short-circuiting of source 10, causing the current through switch 3 to increase in the interval T4–T6, as illustrated by waveform 202 of FIG. 2b. The increasing current flowing in path $I_B$ similarly decreases the net current flow through switch 4 and increases the net current flow through switch 2. Just before time T6, the current flow through switches 1 and 4 reaches zero value (201 of FIG. 2a) or is minimized if it does not reach zero value. Also at time T6, the current in switches 2 and 3 reaches a maximum value (202 of FIG. 2b). Intervals T2–T4 and T4–T6, during which all four switches are closed, together constitute the second of the four operating intervals of the recurrent sequence of operating intervals.

Figure 1E:
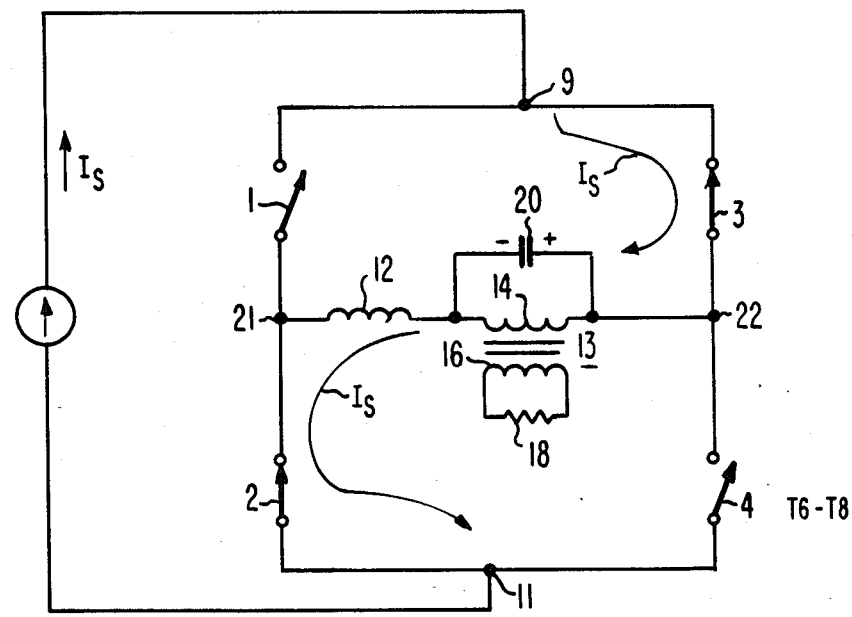

At time T6, switches 1 and 4 are opened or rendered nonconductive to begin a third interval of the recurrent cycle of four intervals. The opening of switches 1 and 4 occurs at a minimum current. During interval T6–T8, current having a magnitude of $I_s$ flows from terminal 9 through conductive switch 3 in a negative direction, through primary winding 14 and inductor 12, and through conductive switch 2 to terminal 11. As mentioned, current flow to the left through winding 14 is defined as negative current flow, and is illustrated by waveform 203 of FIG. 2c as $-I_s$ in the interval T6–T8. The zero current in open switches 1 and 4, and current $I_s$ in conductive switches 2 and 3 during interval T6–T8 are illustrated by 201 of FIG. 2a and 202 of FIG. 2b, respectively. The inverter will continue in the state illustrated by FIG. 1e indefinitely unless the switch configuration is altered.

Figure 1F:
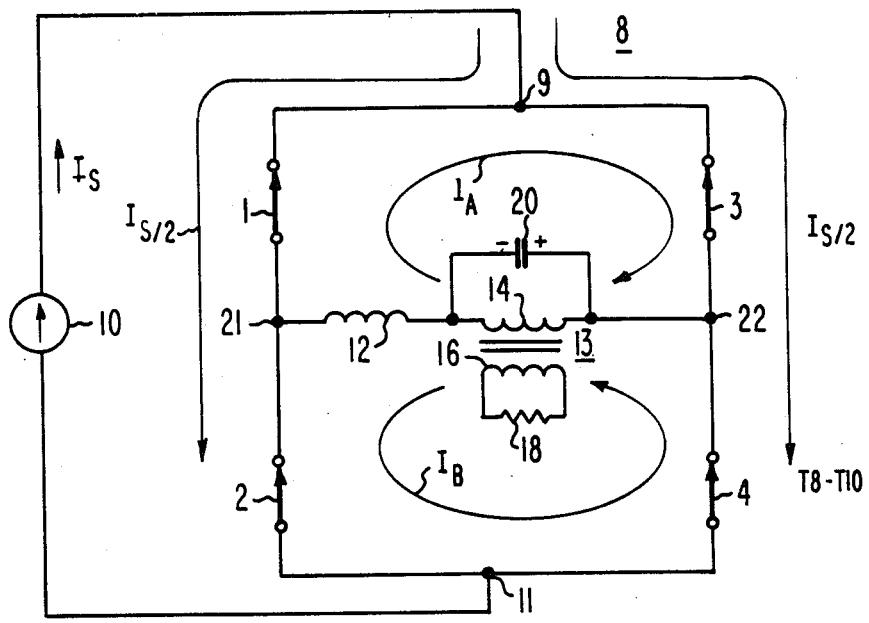

The fourth and last interval of the recurrent sequence of four intervals begins at a time T8, at which time switches 1 and 4 are rendered conductive, so that all switches are conductive until a later time T0. As in the case of the intervals T2–T6, closure of all four switches short-circuits current source 10 to cause current $I_s$ to divide at terminal 9 to produce a current magnitude $I_s/2$ through the series paths consisting of closed switches 1 and 2, 3 and 4. The closure of all switches also creates current paths $I_A$ and $I_B$ by which inductor 12 can ring with capacitor 20 (FIG. 1f). Just before time T8, current was flowing in the negative direction or to the left through inductor 12. As mentioned, current continues to flow in inductor 12 after the switches are closed, causing a decreasing current to flow through inductor 12 and in current paths $I_A$ and $I_B$ as energy is transferred from the magnetic fields associated with inductor 12 to load transformer primary 14. At time T8, the current flowing in path $I_A$ has a magnitude of $I_s/2$, and the current flowing in path $I_B$ also has a magnitude of $I_s/2$. The net current through switches 1 and 4 at time T8 is zero, and the net current through switches 2 and 3 at time T8 is $I_s$. Thus, as at time T2, closure of all switches has no immediate effect on the currents. In the interval T8–T10, the currents flowing in current paths $I_A$ and $I_B$ decrease, causing an increasing net current to flow through switches 1 and 4 as illustrated by current 201 of FIG. 2a, and causing a decreasing net current flow through switches 2 and 3 as illustrated by current 202 of FIG. 2b.

Figure 1G:
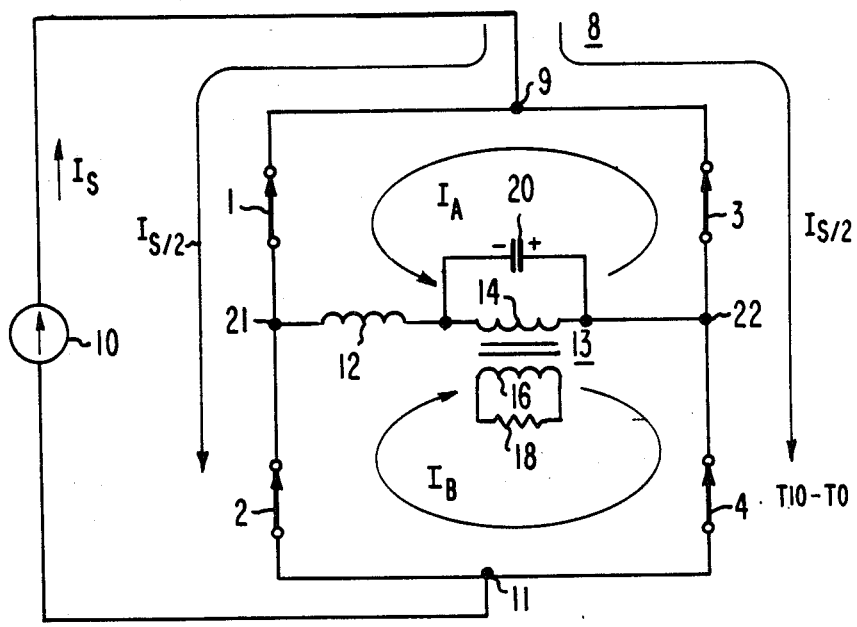

At time T10, the energy associated with inductor 12 is exhausted, and the ringing currents flowing in current paths $I_A$ and $I_B$ are reduced to zero magnitude. At time T10, capacitor 20 has a maximum voltage thereacross poled as illustrated in FIG. 1g as a result of storage therein of a maximum amount of energy. At time T10, current having a magnitude $I_s/2$ flows in each of switches 1, 2, 3 and 4. This is illustrated by waveforms 201 (switches 1 and 4) and 202 (switches 2 and 3) of FIGS. 2a and 2b, respectively. At time T10, the load current is zero, as illustrated by waveform 203 of FIG. 2c.

In the interval T10–T0, which is the last half of the fourth interval, the current configuration is similar to that illustrated in FIG. 1g. All the switches remain closed, and a current attributable to the short-circuiting of source 10 and having magnitude $I_s/2$ flows through each switch. An increasing current flows in the direction indicated in FIG. 1g in current paths $I_A$ and $I_B$ under the impetus of the high voltage on capacitor 20. The ringing currents in paths $I_A$ and $I_B$ progressively increase, thereby adding to the currents flowing in switches 1 and 4, and reducing the currents flowing in switches 2 and 3. Just before time T0, the ringing currents reach a maximum value, which reduces to zero or at least minimizes the net currents flowing in switches 2 and 3. If the ringing currents flowing in current paths $I_A$ and $I_B$ each have a magnitude of $I_s/2$, the currents flowing in switches 2 and 3 just before time T0 will have zero magnitude, and the net current flowing in switches 1 and 4 will have a net magnitude of $I_s$. Also, the current flowing through inductor 12 and primary winding 14 will be positively directed and have magnitude $I_s$. At time T0, switches 2 and 3 are rendered nonconductive or opened to begin the first interval (T0–T2) of the succeeding cycle. This corresponds to FIG. 1a.

The described energization of an inverter bridge with a substantially constant current, simultaneous or overlapped conduction of the switches of the converter, and tuning of the load as described above substantially reduces the switching stress which the switches of the inverter must sustain during operation, and substantially reduce the fall time losses of the switches.

As so far described in conjunction with FIGS. 1a–1g and FIG. 2, switch pairs 1, 4 and 2, 3 are opened when the resonant current flowing through paths $I_A$ and $I_B$ cause a minimum net current to flow in the switches. There are a plurality of possible current minimums which occur due to the resonant currents flowing in paths $I_A$ and $I_B$.

Figure 3:
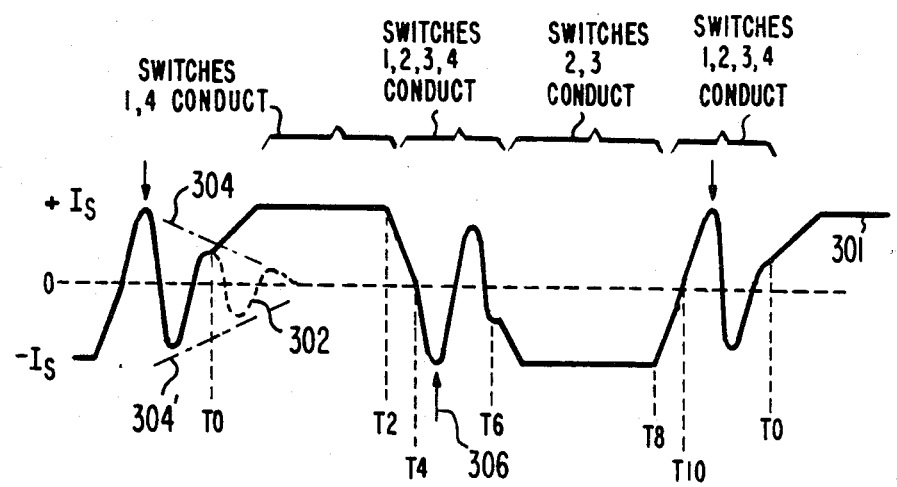
FIG. 3 is a timing diagram similar to FIG. 2c illustrating operation of another embodiment of the invention.

FIG. 3 illustrates as a plot 301 the load current through winding 14 as a function of time for a mode of operation in which the opening of the switch pairs is delayed until the second current minimum, rather than being open on the first current minimum. In FIG. 3, times T0–T10 are ascribed the same meaning which they have in FIGS. 1a–1g and in FIG. 2. Towards the end of interval T0–T2 in FIG. 3, current having a magnitude of $+I_s$ flows in the load. In the interval T2–T6, all the switches are conductive. In the interval T2–T4, inductor 12 exhausts its current while charging capacitor 20. In the interval T4–T6, the load current goes through $1\frac{1}{4}$ oscillatory cycles before switches 1 and 4 are opened, rather than going through $\frac{1}{4}$ cycle. The amplitude of the oscillations decreases as illustrated by the phantom oscillations 302 and by lines 304, 304', which outline the envelope of the decreasing oscillations. This decrease in oscillatory amplitude occurs because the resonant flow through primary winding 14 is damped by the energy supplied to the load. Consequently, at time T6 the peak magnitude of the resonant current is less than on the first peak. Consequently, the minimization of current in the switches 1 and 4, which are opened at time T6, is less complete than for opening on the first resonant peak (arrow 306). At time T6, therefore, the load current has a magnitude of less then $I_s$, which results in a voltage spike (not illustrated) which causes a rapid increase in the current after time T6 to value $-I_s$. The $-I_s$ current magnitude is maintained for the interval T6–T8. Similarly, at time T8, switches 1 and 4 are closed to initiate a further cycle of oscillation which ends at time T0. Thus, it is possible to select other current minimum points at which opening of the switches of the inverter bridge may occur and which also reduce the stress imposed on the switches during opening. However, the reduced magnitude of these current minima is less effective in reducing stress then the first minimum.

Figure 4:
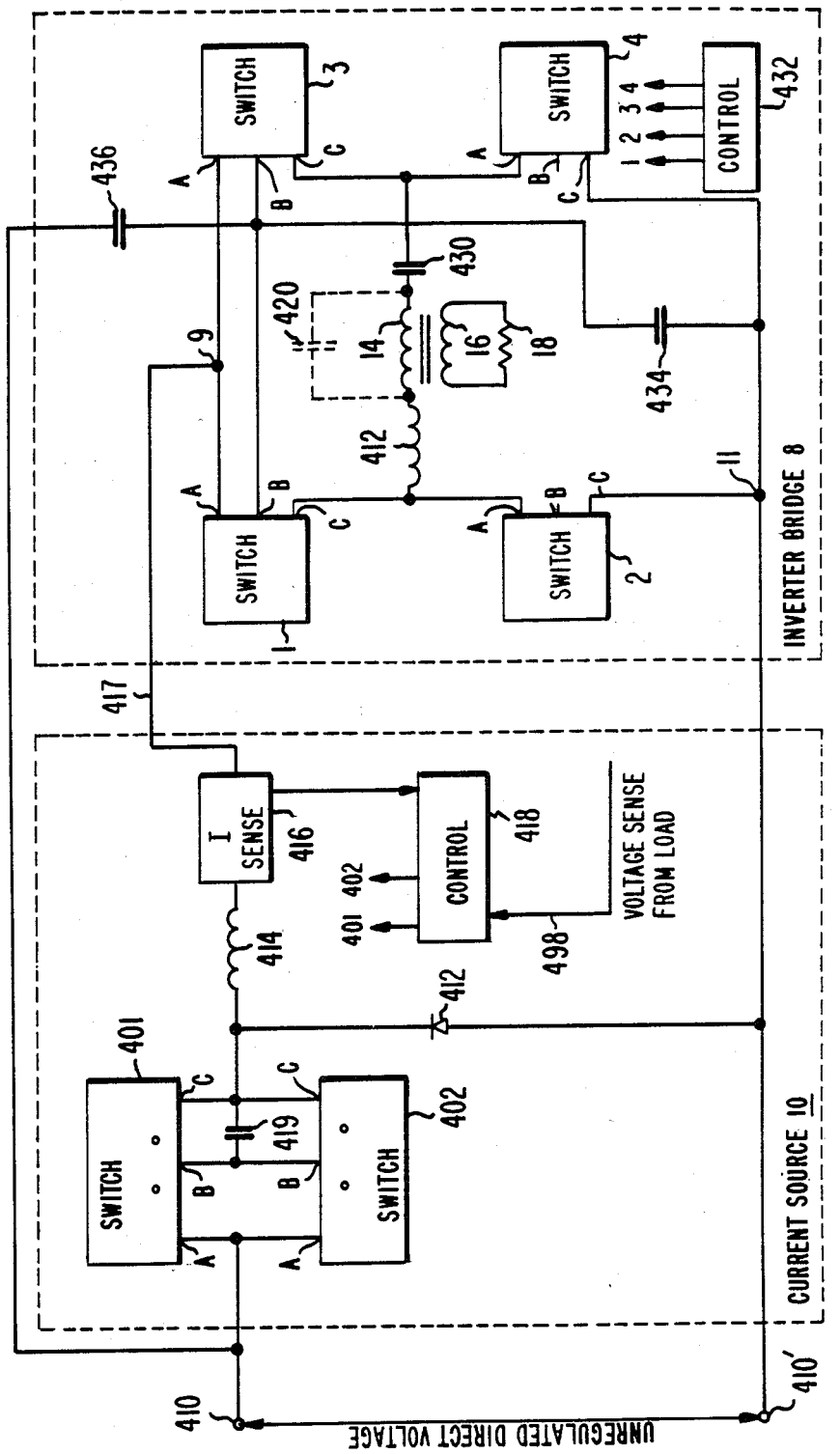
FIG. 4 is a block diagram of a current source and an inverter according to the invention.

FIG. 4 is an overall block diagram of current source 10 and inverter 8. In FIG. 4, elements corresponding to those of FIGS. 1a–1g are designated by the same reference numerals. In FIG. 4, terminals 410, 410' at the left are adapted for receiving unregulated direct voltage. Current source 10 includes identical bipolar switch assemblies 401 and 402 having A, B, and C terminals, the A terminals of which are connected to terminal 410. The C terminals of switch assemblies 401 and 402 are coupled together and to inductor 414 for supplying current to inductor 414 from terminal 410 when switch assemblies 401 and 402 are conductive. The cathode of a free-wheeling diode 412 is connected to terminals C of switch assemblies 401 and 402, and its anode is connected to terminal 410' for maintaining current through inductor 414 during those intervals in which switch assemblies 401 and 402 are nonconductive. The current flow through inductor 414 is applied by way of a current sensing element 416 and a conductor 417 to terminal 9 of inverter bridge 8. A voltage representative of the sensed current is applied from current sense element 416 to a control circuit 418 for overcurrent limit control. Control circuit 418 also receives a sample of load voltage by a conductor 498 from the ultimate load for controlling the conductive and nonconductive intervals of switch assemblies 401 and 402 in a well-known feedback manner for maintaining a substantially constant current through conductor 417. The B terminals of switch assemblies 401 and 402 are connected together and are also connected by way of capacitor 419 to their C terminals for purposes described below.

Switches 1, 2, 3 and 4 of inverter bridge 8 are implemented as switch assemblies identical to switch assemblies 401 and 402. Their connections are substantially identical to those described in detail in conjunction with FIGS. 1a–1g, except that inductor 12 is replaced by the leakage inductance (illustrated as an inductor 412) of winding 14, the capacitance with which inductance 412 resonates is the self-capacitance (distributed capacitance illustrated as 420) of the windings of primary winding 14, and a capacitor 430 is illustrated as being in series with inductor 412 and winding 14 for preventing any tendency to transformer saturation due to any slight current unbalance which might occur. The B terminals of switch assemblies 1 and 3 are connected together and to a "clamp voltage" capacitor bank including capacitors 434 and 436 connected between terminals 410 and 410'. A control circuit illustrated as 432 provides timed square wave drive to switch assemblies 1, 2, 3 and 4.

Figure 5:
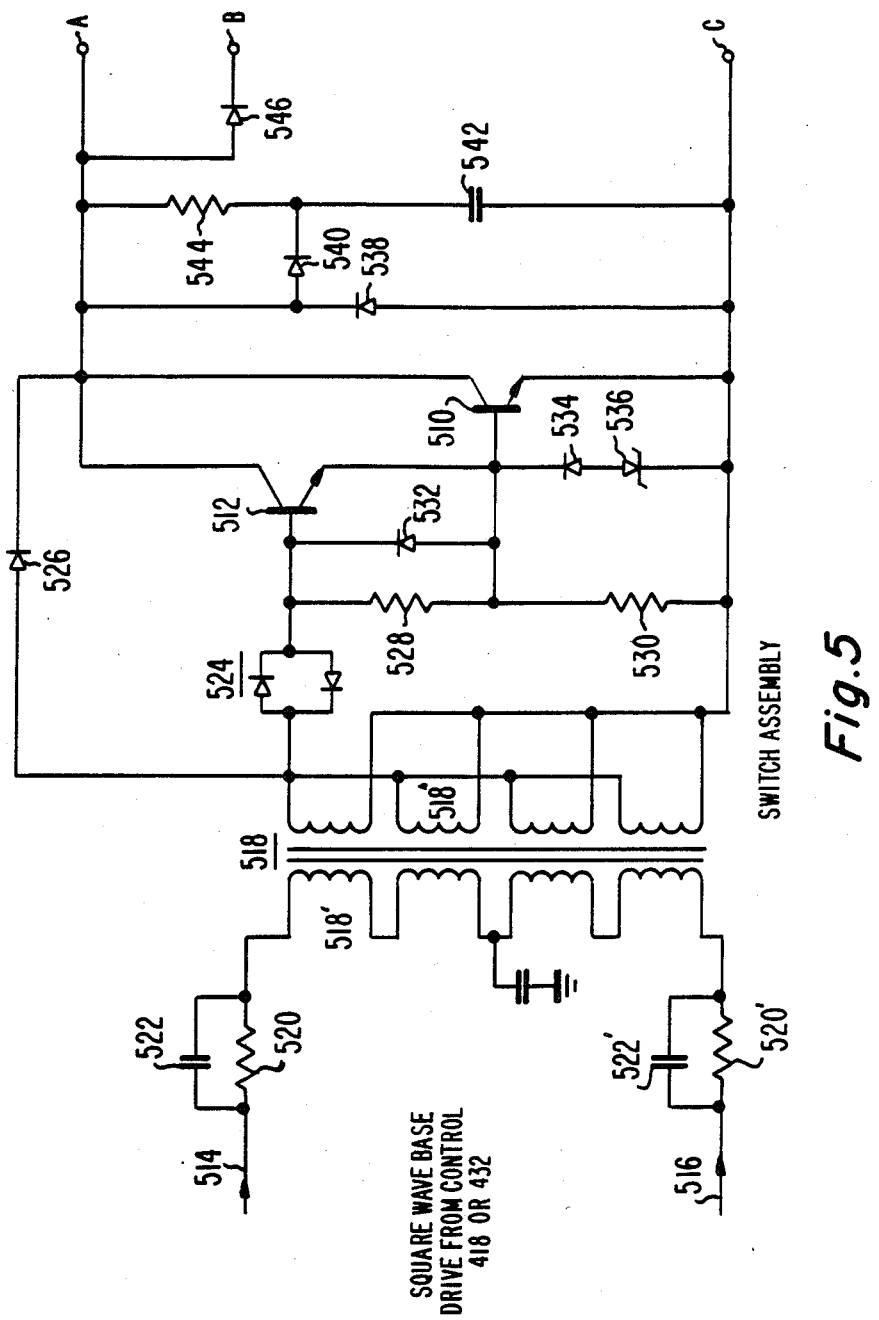
FIG. 5 is a schematic diagram of a bipolar transistor switch usable in the arrangement of FIG. 4.

FIG. 5 is a schematic diagram of a switch assembly of FIG. 4. In FIG. 5, a bipolar transistor 510 has its collector connected to terminal A and its emitter connected to terminal C to provide a main path for current flow between terminals A and C. Base drive for transistor 510 is provided by a transistor 512 connected in a Darlington-like manner for providing enhanced gain and to also provide a further path for the flow of current between terminals A and C by way of the collector-to-emitter path of transistor 512 and the base-to-emitter path of transistor 510. Base drive is applied to transistor 512 from base drive input terminals 514 and 516 by way of a transformer designated generally as 518 which has series-connected primary windings 518' to maintain a relatively high input impedance and parallel-connected secondary windings 518″ for low impedance base drive. A pair of resistors 520, 520′ is connected between primary winding 518′ and terminals 514, 516, respectively. Speed-up capacitors 522, 522′ are connected across resistors 520, 520′, respectively. Secondary winding 518″ of transformer 518 applies base drive to transistor 512 by way of antiparallel-connected diodes designated generally as 524. Diodes 524 in conjunction with a further diode 526 connected between the collector of transistor 510 and secondary winding 518″ prevents transistors 510 and 512 from going into deep saturation during their conductive interval, which aids in reducing their turn-off time. A voltage divider including resistors 528, 530 is connected between the base of transistor 512 and terminal C. A diode 532 is connected across resistor 528, and a diode 534 is connected across resistor 530, both to prevent rectification of the base drive current and thereby aid in reducing saturation of transformer 518. A zener diode 536 is connected in series with diode 534 to compensate for the voltage drop across the base-emitter junction of transistor 510 attributable to the heavy base current flow in the resistive component of the base-emitter diode impedance. A diode 538 has its cathode connected to terminal A and its anode connected to terminal C to prevent any possibility of application of reverse voltage to transistors 510 and 512. A diode 540 and a capacitor 542 are connected between terminals A and C for tending to charge towards peak voltage appearing between terminals A and C. A resistor 544 connected across diode 540 discharges capacitor 542 to near zero volts during the time intervals when transistor 510 is conducting. This "snubber" network tends to reduce the rate of rise of voltage across terminals A and C. A "clamp" diode 546 has its anode connected to terminal A and its cathode connected to terminal B. When terminal B is connected as illustrated in FIG. 4, the connection of diode 540 clamps the voltage between terminals A and C at the external capacitor voltage.

Figure 6:
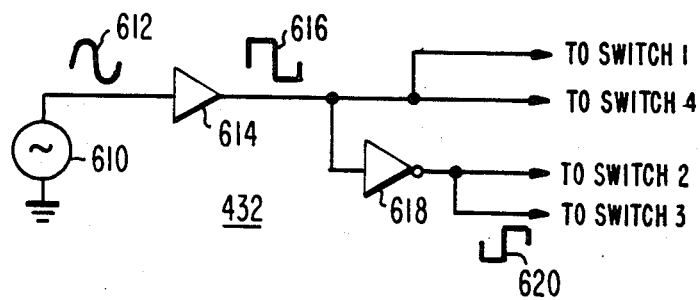
FIG. 6 is a simplified schematic diagram of a control circuit which may be used in the arrangement of FIG. 4.

FIG. 6 illustrates a simplified form of control circuit 432. In FIG. 6, control circuit 432 includes an oscillator 610 which oscillates at the inverter frequency, such as 10 KHz, to produce a sinusoidal waveform illustrated as 612. Sinusoidal signal 612 is applied to a saturating amplifier 614 to produce a square wave illustrated as 616 which is applied as base drive to switches 1 and 4. Square wave 616 is also applied to an inverting amplifier 618 which produces an inverted or out-of-phase squarewave 620 which is applied as base drive to switches 2 and 3.

Figure 7:
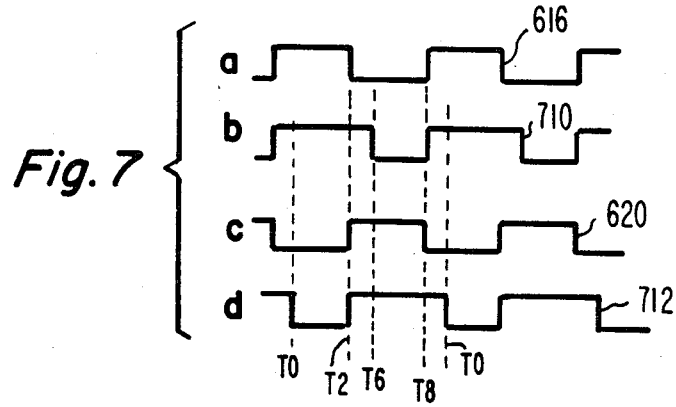
FIG. 7 is a timing diagram of transistor drive produced by the control circuit of FIG. 6 and the resulting conduction of the transistors of FIG. 5.

FIG. 7a illustrates square wave 616, and FIG. 7c illustrates square wave 620. FIG. 7b represents as 710 the conductive interval of a bipolar transistor switch such as switch 1 or 4 in response to square wave 616. A high level of waveform 710 represents a conductive interval and a low level represents a nonconductive interval. As illustrated, the conductive intervals represented by waveform 710 occur during the logic high levels of waveform 616 and for a short period thereafter. The short period of additional conduction is a well known characteristic of bipolar transistors used in switching applications, and is attributable to the length of time required to remove charge carriers from the base region after reversal of base drive. As illustrated, waveform 620 of FIG. 7c is phase inverted relative to waveform 616. FIG. 7d represents as a high level of a waveform 712 the conductive intervals of switches 2 and 3 in response to base drive by signal waveform 620 of FIG. 7c. As illustrated, switches 2 and 3 are conductive during intervals in which waveform 620 is at a logic high level, and remain conductive for a short period thereafter. Comparison of the conductive periods represented by waveforms 710 and 712 shows that there is overlap in the conduction during the intervals T2-T6 and T10-T0, corresponding to the intervals T2-T6 and T10-T0 of FIGS. 1a-1g and FIG. 2. Thus, a nonoverlapping base drive may result in conduction overlap when bipolar switch transistors are used.

Figure 8:
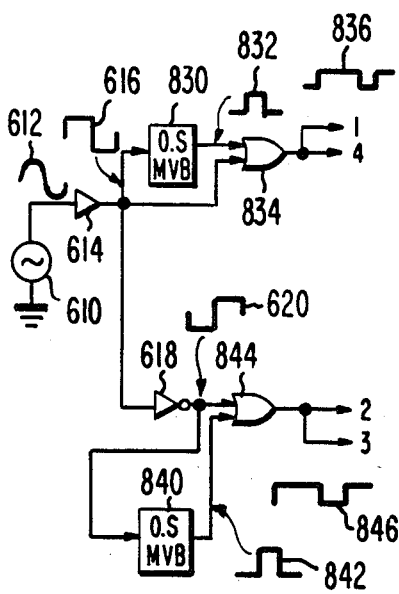
FIG. 8 is a simplified schematic diagram of another control circuit which may be used in the arrangement of FIG. 5.
Figure 9:
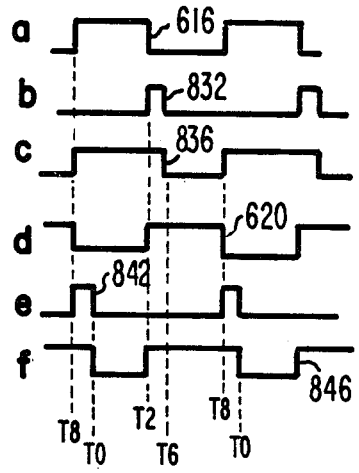
FIG. 9 is a timing diagram illustrating the operation of the control circuit of FIG. 8.

If FET switches are used rather than bipolar switches, or if the overlap period provided by the use of bipolar transistors is insufficient, the arrangement of FIG. 8 may be used for control of the switches of inverter bridge 8. Elements of FIG. 8 corresponding to those of FIG. 6 are designated at the same reference numerals. In FIG. 8, the square wave 616 at the output of saturating amplifier 614, instead of being applied as base drive directly to switches 1 and 4, is applied to an input of an OR gate 834 and to an input of a one-shot multivibrator (OSMVB) 830 which produces a short duration pulse illustrated as 832 in response to negative-going transitions of waveform 616. The signal, illustrated as 836, at the output of OR gate 834 is the sum of the logic high portions of waveform 616 and 832. It will be noted that the base drive has an "ON" (logic high) level of longer duration than the "OFF" (logic low) levels. FIGS. 9a, b, and c illustrate the relative timing of square wave 616, pulse 832 and signal 836.

In FIG. 8, the inverted square wave 620 at the output of inverting amplifier 618, instead of being applied directly as base drive to switches 2 and 3, is instead applied to an input of an OR gate 844 and to the input of a OSMVB 840 which produces at its output a pulse of constant duration illustrated as 842 on each negative transition of square wave 620. OR gate 844 adds together square wave 620 and pulse 842 to produce a signal 846 which is applied as base drive to switches 2 and 3. FIGS. 9d, e and f illustrate the relative timing of square wave 620, pulse 842 and resulting signal 846, and also the relative timing between waveforms 836 and 846. As illustrated, there is an overlap in conduction as represented by waveforms 836 and 846 in the intervals T2-T6 and T8-T0.

Other embodiments of the invention will be apparent to those skilled in the art. In particular, the switches may be opened at times which are not at current minima, but at times when the current is less than $I_s/2$, and a benefit will be obtained.

What is claimed is:

1. A direct-current to alternating-current inverter, comprising:
    a first series combination of first and second controllable switches having a first intermediate terminal therebetween, said first series combination of first and second controllable switches being adapted to be coupled to first and second terminals of a source of substantially constant direct current for, when closed, conducting at least a portion of said substantially constant direct current;
    a second series combination of third and fourth controllable switches having a second intermediate terminal therebetween, said second series combination of third and fourth controllable switches being coupled in parallel with said first series combination of first and second controllable switches for, when closed, conducting at least a portion of said substantially constant direct current;

a load coupled to said first and second intermediate terminals for having applied thereacross alternating voltages which depend upon the combination of said first, second, third and fourth controllable switches which are conducting;

capacitance means coupled across said load to form a parallel capacitance-load circuit;

inductance means serially coupled with said capacitance-load circuit for conducting alternating capacitance-load current;

switch control means coupled to said first, second, third and fourth controllable switches for, in recurrent sequence of four intervals, (a) maintaining said first and fourth controllable switches conductive and said second and third controllable switches nonconductive during a first interval of said recurrent sequence, for directing said substantially constant direct current through said inductance means and said load in a first polarity, and for charging said capacitance means in a first polarity, (b) for rendering said second and third controllable switches conductive during a second interval of said recurrent sequence, whereby said first, second, third and fourth controllable switches are conductive, thereby reducing the voltage between said first and second intermediate terminals to zero, and creating paths including said first, second, third and fourth controllable switches by which said inductance means can ring with said capacitance means to form a first ringing current such that the current flow in said first and fourth controllable switches is decreased by said ringing current, (c) for rendering said first and fourth controllable switches nonconductive at a time when the current therethrough is less than one-half said substantially constant direct current to initiate a third interval of said recurrent sequence, whereby only said second and third controllable switches are conductive during said third interval of said recurrent sequence, whereby a voltage appears across said first and second intermediate terminals which is poled to cause said substantially constant direct current to flow through said inductance means and said load in a second polarity, and for charging said capacitance means in a second polarity, (d) for rendering said first and fourth controllable switches conductive during a fourth interval of said recurrent sequence, whereby said first, second, third and fourth controllable switches are conductive, thereby reducing said voltage between said first and second intermediate terminals to zero, and creating paths including said first, second, third and fourth switches by which said inductance means can ring with said capacitance means to form a second ringing current in such a manner that the current flow in said second and third switches is decreased by said ringing current, and (e) for rendering said second and third controllable switches nonconductive at a time when the current therethrough is less than one-half said substantially constant direct current, whereby only said first and fourth controllable switches are conductive to begin another said first interval of said recurrent sequence.

2. An inverter according to claim 1, wherein if the durations of said second and fourth intervals of said recurrent sequence are protracted, said first and second ringing currents go through a plurality of values which result in a plurality of minimum values of currents in those controllable switches which are nonconductive during the succeeding third and first intervals, respectively, of said recurrent sequence, and said switch control means causes said first and fourth, and said second and third controllable switches to be rendered nonconductive during said second and fourth intervals, respectively, during the first minimum from among said plurality of minimum values.

3. An inverter according to claim 1, wherein said load comprises the primary winding of transformer.

4. An inverter according to claim 3, wherein said capacitance means includes the interwinding capacitance of said primary winding.

5. An inverter according to claim 3, wherein said inductance means includes the leakage inductance of said transformer.

6. An inverter according to claim 3, wherein said capacitance means comprises a discrete capacitor.

7. An inverter according to claim 3, wherein said inductance means comprises a discrete inductor.

8. An inverter according to claim 1, further comprising second capacitance means serially coupled with said load.

9. A method for operating a bridge inverter driven from a substantially constant current for driving a load coupled in parallel with capacitance means thereby forming a parallel circuit, said parallel circuit being coupled in series with inductance means thereby forming a series circuit, comprising, in the following order, the recurrent steps of:

coupling said series circuit for receiving said substantially constant current in a first polarity;

applying a short-circuit across said series circuit a first time;

removing said short-circuit a first time;

simultaneously with said step of removing said short circuit a first time, coupling said series circuit for receiving said substantially constant current in a second polarity;

applying a short-circuit across said series circuit a second time; and removing said short-circuit from across said series circuit a second time, and simultaneously returning to the first-mentioned of said recurrent steps.

10. A method according to claim 9, wherein said steps of applying a short-circuit a first time and of applying a short-circuit a second time each comprise the steps of:

applying a short-circuit by a first path; and applying a short-circuit by a second path.

* * * * *